United States Patent [19]

Hollister et al.

[11] 4,067,361

[45] Jan. 10, 1978

[54] SILENT SELF-CONTROLLED ORIFICIAL RESTRICTOR

[75] Inventors: James F. Hollister, Waterford; James E. McGill, Norwich; William H. Stoddard, N. Stonington, all of Conn.

[73] Assignee: The United States of America as represented by the Secretary of the Navy, Washington, D.C.

[21] Appl. No.: 679,127

[22] Filed: Apr. 21, 1976

[51] Int. Cl.² ............................................. F15D 1/02
[52] U.S. Cl. ........................................ 138/42; 138/40; 138/44; 138/45; 137/625.37; 137/625.38; 181/268
[58] Field of Search .................. 138/42, 43, 44, 45, 138/45 A, 40, 31; 137/625.28, 625.3, 625.33, 625.37, 625.38; 251/127; 181/46, 56

[56] References Cited

U.S. PATENT DOCUMENTS

| 486,722 | 11/1892 | Loss | 137/625.33 |
|---|---|---|---|
| 582,445 | 5/1897 | Tippett | 251/127 X |
| 920,392 | 5/1909 | Rider | 138/43 X |
| 1,473,349 | 11/1923 | Kach | 138/40 X |
| 3,060,957 | 10/1962 | Richards | 137/625.33 X |
| 3,156,262 | 11/1964 | Attebo | 138/43 |
| 3,665,965 | 5/1972 | Baumann | 138/42 |
| 3,893,479 | 7/1975 | Tassie | 137/625.3 |
| 3,917,222 | 11/1975 | Kay et al. | 137/625.28 X |
| 3,954,124 | 5/1976 | Self | 138/43 X |
| 3,964,516 | 6/1976 | Purton et al. | 137/625.38 |

FOREIGN PATENT DOCUMENTS

| 801,510 | 12/1950 | Germany | 137/625.3 |

Primary Examiner—Richard E. Aegerter
Assistant Examiner—James E. Bryant, III
Attorney, Agent, or Firm—R. S. Sciascia; Paul S. Collignon

[57] ABSTRACT

An orificial restrictor for use in a ballasting system for an underwater vehicle utilizing a plurality of multi-holed orifice plates set in series within a casing. A hollow cylinder is slidably positioned within the casing and carries fluid supplied through an inlet in the case. A spring biases the cylinder toward the inlet and fluid pressures opposes the spring force to move the cylinder away from the inlet whereby the hollow cylinder automatically positions itself with pressure changes to control the number of orifice plates subject to flow.

5 Claims, 4 Drawing Figures

SILENT SELF-CONTROLLED ORIFICIAL RESTRICTOR

BACKGROUND OF THE INVENTION

The present invention relates to a fluid valve and more particularly to a silent constant flow valve for use in a hovering system for an underwater vehicle.

Fluid flowing through a valve between differential pressure areas can generate extremely high noise levels. The problems attendant upon the generation of noise include not only the human reaction criteria of annoyance, damage to hearing and reduction in work efficiency, but also the effect on physical structure and equipment, such as structural fatigue and equipment malfunction. On ships, however, and particularly on submarines, the sounds generated by valves, are most objectionable as these sounds can be detected by an enemy and can compromise the security of a mission.

Heretofore, various devices have been used to control or reduce noise in pressure devices. Mufflers, attenuation chambers, absorption devices and noise insulators have been used with some success. Recently, there has been introduced several apparatuses for reducing the pressure of gaseous or liquid media flowing through a pipe or duct with minimum or greatly reduced generation of noise or unwanted sound. One such device is shown and described in U.S. Pat. No. 3,665,965, which issued May 30, 1972, to Hans D. Baumann. In this patented device, a plurality of low noise throttling plates are positioned in a fluid flow containing conduit. The low noise throttling plates are passaged by multiple small section orifices producing a high frequency pressure wave whose noise is more readily attenuated by the conduit.

SUMMARY OF THE INVENTION

The present invention provides an orificial restrictor valve which maintains a constant fluid flow over a wide range of pressures thus making a quiet ballasting operation possible. In one embodiment, a first set of spaced inner orifice plates, each having a plurality of holes therethrough, are stationarily mounted in a casing and a second set of outer orifice plates, each also having a plurality of holes therethrough, surround the first set. A small gap or space separates the two sets of orifice plates and a hollow cylinder is movable in the gap between the two sets of plates. The hollow cylinder is springbiased toward an inlet and fluid entering the inlet passes through the hollow cylinder and, in addition, moves the hollow cylinder further into the gap between the two sets of orifice plates.

The orifice plates are designed to maintain a nearly constant flow at all inlet pressures. This is accomplished by the hollow cylinder which automatically positions itself with pressure changes to control the number of orifice plates subject to flow.

It is therefore a general object of the present invention to provide a valve which will provide constant fluid flow over a wide range of pressures in order to reduce attendant noise in a ballasting system.

Other objects, advantages and novel features of the present invention will become apparent from the following detailed description of the invention when considered in conjunction with the accompanying drawings.

DESCRIPTION OF THE PREFERRED EMBODIMENT

Figure 1:
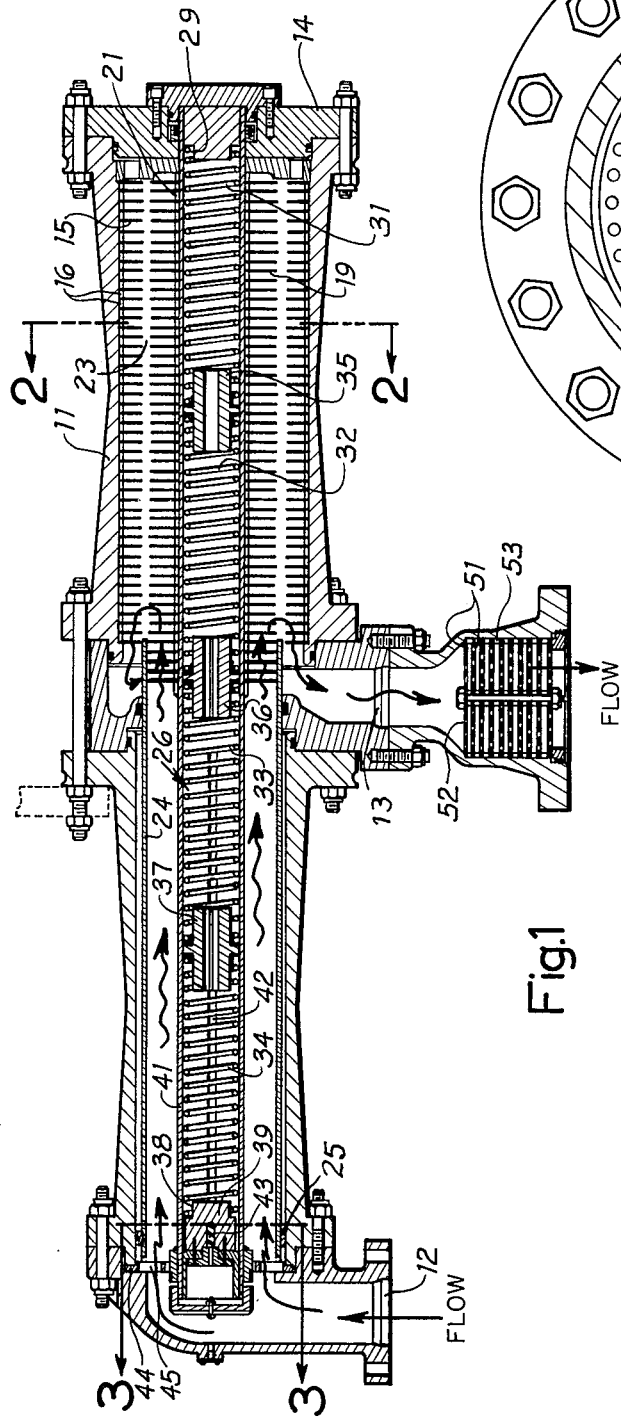
FIG. 1 is a longitudinal sectional view of a preferred embodiment of the present invention.
Figure 3:
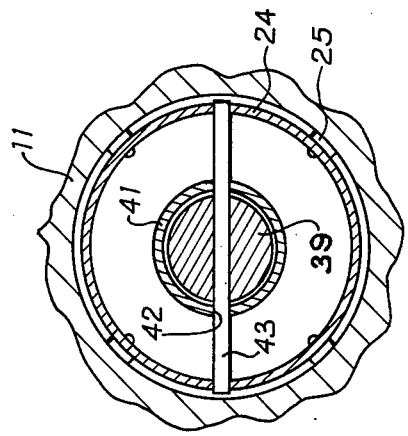
FIG. 3 is a partial cross-sectional view taken on line 3—3 of FIG. 1.

Referring now to the drawings, there is shown in FIG. 1, an orificial restrictor assembly having a casing 11 with an inlet 12 and an outlet 13. The outlet is positioned about midway of casing 11 and the end of casing 11 opposite the inlet is closed with a plate 14 which is attached, as by bolts, to casing 11. A plurality of multi-holed orifice plates 15 are positioned within casing 11 and are spaced apart by a plurality of spacers 16. Orifice plates 15 extend from about outlet 13 to end plate 14 and have an outer diameter only slightly smaller than the inner diameter of casing 11. Orifice plates 15 each having a plurality of holes 17 therethrough for passage of fluid and, while plates 15 are substantially identical, alternate plates are preferably positioned so that the plurality of holes 17 will not be aligned. Thus holes 17 in adjacent plates will not present a straight passageway for fluid passing through a plurality of plates.

Figure 2:
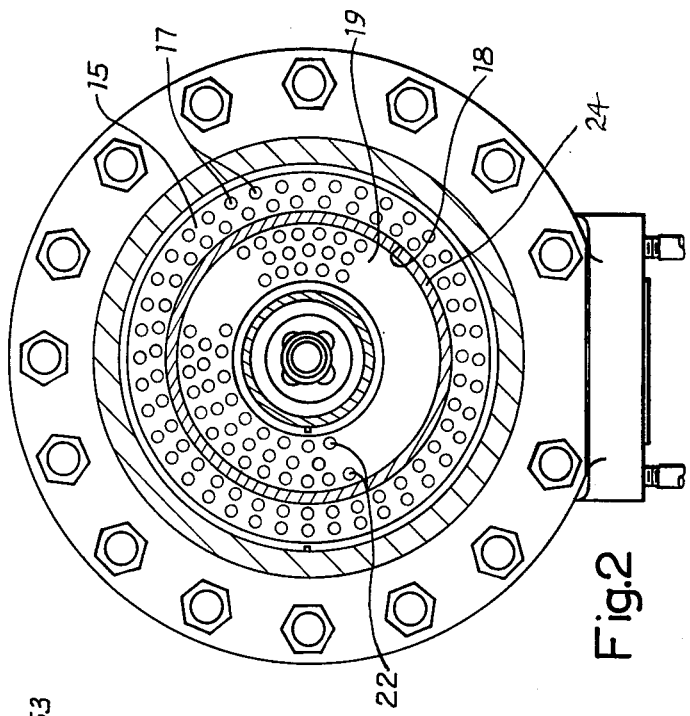
FIG. 2 is a cross-sectional view taken on line 2—2 of FIG. 1.

Each plate 15 has a large diameter hole 18 therein so that a plurality of multi-holed orifice plates 19 can be placed within the plurality of multi-holed orifice plates 15. Orifice plates 19 are also separated by separators 21 and while orifice plates 19 are substantially identical, alternate plates are preferably positioned so that the holes 22 are not aligned. As best shown in FIG. 2 of the drawings, plates 15 and 19 are concentric and there is a space 23 between plates 15 and 19.

A hollow cylinder 24 is provided within casing 11 and is movable by fluid pressure to move in space 23 between plates 15 and 19. Cylinder 24 is of sufficient length so that when one end is near inlet 12 the other end extends beyond outlet 13. Additionally, cylinder 24 is of sufficient inside diameter so that the fluid entering through inlet 12 can pass only through cylinder 24. A plurality of bearings 25 are attached near the end of cylinder 24 and engage the inside bore surface of casing 11. A spring assembly 26 is provided to bias cylinder 24 toward the inlet 12 of casing 11.

Spring assembly 26 is shown comprised of four springs 31, 32, 33, and 34, with one end of spring 31 being positioned in spring seat 29 which is attached to end plate 14. Three additional spring seats 35, 36, and 37 are provided, as best shown in FIG. 1 of the drawings and, in addition, a spring seat 38 is provided on retainer 39. The springs, spring seats and retainer 39 are all positioned within a cylindrical sleeve 41 which is provided with slots 42 so that a connecting bar 43 can pass therethrough to connect retainer 39 with cylinder 24. It can readily be seen that movement of cylinder 24 causes a corresponding movement of retainer 39, however, movement of retainer 39 is resisted by springs 31, 32, 33, and 34. The springs are designed so that cylinder 24 maintains a nearly constant fluid flow at all inlet pressures within design range. Cylinder 24 automatically positions itself with pressure changes to control the number of orifice plates subject to flow. Pressure drop across the orifice plates 19 through which fluid passes results in a net pressure force on cylinder 24, which is opposed to the force supplied by springs 31, 32, 33, and 34. As inlet pressure is increased, the net pressure force is also increased and cylinder 24 moves to a new balanced force position by compressing the springs, thereby increasing the number of orifice plates through which the fluid must flow before passing through outlet 13. One end of cylindrical sleeve 41 is supported by end plate 14 and the other end of sleeve 41 is supported by a circular plate 44 which has large holes 45 therein through which fluid can pass.

Referring specifically to the outlet 13, a plurality of multi-holed orifice plates 51 are provided in order to maintain sufficient back pressure in order to avoid possible cavitation when discharging to atmospheric pressure. Each plate 51 is provided with a plurality of holes 52 and plates 51 are separated by spacers 53. While plates 51 might be identical they are positioned so that holes 52 in adjacent plates are not aligned. Plates 51 are similar to the plates in the variable portion except that plates 51 are designed for lower velocity and pressure drops to discharge to a lower back pressure without creating noise.

Figure 4:
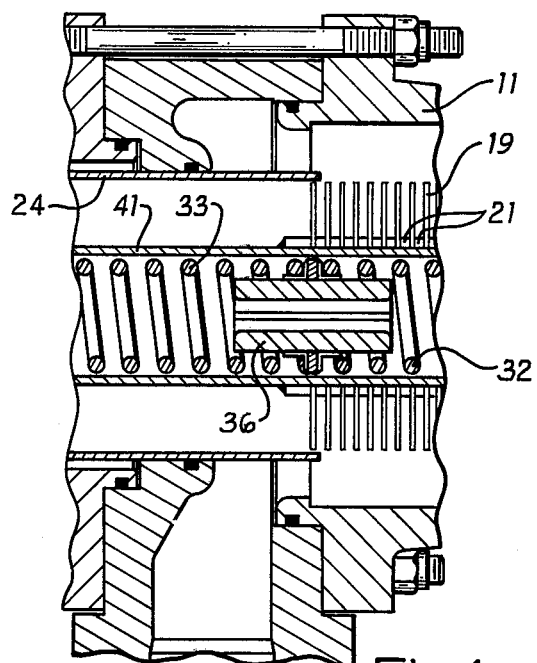
FIG. 4 is a partial longitudinal sectional view of another embodiment of the present invention.

FIG. 4 of the drawings shows a modification of the device shown in FIG. 1 of the drawings wherein only an inner set of plates 19 are provided. This embodiment could be used for low pressure drops.

OPERATION

In operation, fluid, such as water, enters inlet 12 and then passes through holes 45 in plate 44 into hollow cylinder 24. The fluid provides force on the end of cylinder 24 which force counteracts the force applied by the spring assembly and moves cylinder 24 toward end plate 14. The fluid then flows through cylinder 24, a portion of plates 19 and then reverses and travels through a portion of plates 15 and into and out of outlet 13. As inlet pressure is increased, the net pressure force is also increased and cylinder 24 moves to a new balanced force position by compressing springs 31, 32, 33, and 34. As cylinder 24 moves toward end plate 14, more orifice plates are placed into operation and are subject to fluid flow. The springs are designed so that the number of orifice plates in operation is such that the total fluid flow remains essentially constant for all depths at which the device is being operated. This flow restriction maintains quiet operation without objectional throttling noise and a nearly constant flow is provided at all inlet pressures within the design range.

It can thus be seen that the present invention provides a quiet ballasting capability with automatic flow control. Obviously many modifications and variations of the present invention are possible in the light of the above teachings. It is therefore to be understood, that within the scope of the appended claims, the invention may be practiced otherwise than as specifically described.

We claim:

1. A low noise orificial restrictor valve for providing constant fluid flow for different pressure differentials comprising,
   a casing having an inlet and an outlet,
   a plurality of spaced circular orifice plates transversely mounted in said casing, each said circular orifice plate having a front flat face and a rear flat face and having a plurality of holes extending from said front face to said rear face, and
   a hollow cylinder having opened ends slidably positioned in said casing receiving fluid entering said inlet, said hollow cylinder having an inside diameter greater than the diameter of each said circular orifice plate, said hollow cylinder being telescopically movable around said circular orifice plates and being positioned by fluid entering said inlet for directing said fluid through a number of said circular orifice plates dependent upon the position of said hollow cylinder.

2. A low noise orificial restrictor valve for providing constant fluid flow for different pressure differentials as set forth in claim 1 wherein said outlet is positioned about midway the ends of said casing and said hollow cylinder has a length greater than one-half the length of said casing with one end of said hollow cylinder extending beyond said outlet and fluid flowing through said hollow cylinder reverses directions after leaving said hollow cylinder and flows out of said outlet.

3. A low noise orificial restrictor valve for providing constant fluid flow for different pressure differentials comprising,
   a cylindrical casing having an inlet and an outlet,
   inner and outer sets of spaced multi-holed orifice plates transversely mounted in said cylindrical casing, said outer set being spaced from said inner set to provide an annular passageway,
   a hollow cylinder slidably positioned in said cylindrical casing and movable in said annular passageway, and
   spring means biasing said hollow cylinder toward said inlet whereby fluid entering said inlet flows through said hollow cylinder and a given number of said orifice plates determined by the position of said hollow cylinder which is positioned by fluid entering said inlet.

4. A low noise orificial restrictor valve for providing constant fluid flow for different pressure differentials as set forth in claim 3 wherein said outlet has a plurality of spaced multi-holed orifice plates transversely mounted to the path of flow through said outlet for maintaining sufficient back pressure on said valve in order to avoid cavitation when fluid from said outlet is discharged at atmospheric pressure.

5. A low noise orificial restrictor valve for providing constant fluid flow for different pressure differentials as set forth in claim 3 wherein said outlet is positioned about midway the ends of said cylindrical casing and said hollow cylinder has a length greater than one-half the length of said cylindrical casing with one end of said hollow cylinder extending beyond said outlet whereby fluid flowing through said hollow cylinder must reverse directions after leaving said hollow cylinder in order to flow out of said outlet.

* * * * *